(12) United States Patent
Glantzis et al.

(10) Patent No.: US 12,245,109 B2
(45) Date of Patent: Mar. 4, 2025

(54) IDENTIFICATION AND LOCATION OF MULTIPLE PERSONAL AREA NETWORK DEVICES

(71) Applicant: SR Technologies, Inc., Sunrise, FL (US)

(72) Inventors: Nikolaos Glantzis, Coconut Creek, FL (US); Joaquin Prendes, Plantation, FL (US)

(73) Assignee: SR Technologies, Inc., Sunrise, FL (US)

( * ) Notice: Subject to any disclaimer, the term of this patent is extended or adjusted under 35 U.S.C. 154(b) by 337 days.

(21) Appl. No.: 17/671,839

(22) Filed: Feb. 15, 2022

(65) Prior Publication Data

US 2022/0279322 A1    Sep. 1, 2022

Related U.S. Application Data

(60) Provisional application No. 63/151,230, filed on Feb. 19, 2021.

(51) Int. Cl.
*H04W 4/18*    (2009.01)
*H04L 69/22*   (2022.01)
(Continued)

(52) U.S. Cl.
CPC ............ *H04W 4/185* (2013.01); *H04L 69/22* (2013.01); *H04W 4/021* (2013.01); *H04W 64/003* (2013.01); *H04W 72/0446* (2013.01)

(58) Field of Classification Search
CPC ... H04W 4/185; H04W 4/021; H04W 64/003; H04W 72/0446; H04W 4/029; H04W 64/00; H04W 8/005; H04W 84/18; H04W 4/18; H04W 4/025; H04W 72/00; H04W 84/20; H04W 88/00; H04W 4/02; H04W 88/02; H04W 8/00; H04W 4/70;
(Continued)

(56) References Cited

U.S. PATENT DOCUMENTS 10,771,927 B1 *   9/2020  Prendes et al. ........ H04W 4/029
11,622,341 B2 *   4/2023  Smith et al. .......... H04W 60/00
(Continued)

FOREIGN PATENT DOCUMENTS

CN         108684024 A   * 10/2018   ............. H04W 4/80
WO   WO 2012161719 A1   * 11/2012   ............ H04W 8/005

OTHER PUBLICATIONS (CN 108684024 A) >>> Bluetooth Network System (see title) (Year: 2018).*
(Continued)

*Primary Examiner* — Meless N Zewdu
(74) *Attorney, Agent, or Firm* — Goodwin Procter LLP

(57) ABSTRACT

A method and Bluetooth mobile device are disclosed for geo-locating a plurality of target Bluetooth devices. In some embodiments, a method includes distinguishing between time delays associated with received response packets from different target Bluetooth devices based at least in part on Access Codes derived from unique lower address part (LAP) of the received response packets; and determining a location for each of the target Bluetooth devices based at least in part on the time delay associated with the response packet received from the target Bluetooth device.

18 Claims, 11 Drawing Sheets

(51) Int. Cl.
*H04W 4/021* (2018.01)
*H04W 64/00* (2009.01)
*H04W 72/0446* (2023.01)

(58) Field of Classification Search
CPC ....... H04W 4/80; H04W 68/00; H04W 74/06; H04W 72/40; H04W 72/25; H04W 72/121; H04L 69/22; G01S 13/765; G01S 7/4865; G01S 7/487; G01S 7/493; H94W 88/02
See application file for complete search history.

(56) References Cited

U.S. PATENT DOCUMENTS

| | | | | |
|---|---|---|---|---|
| 2007/0173270 | A1* | 7/2007 | Block et al. | 455/507 |
| 2011/0066850 | A1* | 3/2011 | Ekberg | 713/162 |
| 2015/0282088 | A1* | 10/2015 | Weizman et al. | H04W 52/0245 |
| 2016/0234696 | A1* | 8/2016 | Looker et al. | H04W 24/02 |
| 2016/0360526 | A1* | 12/2016 | Lehmann et al. | H04W 72/0446 |
| 2017/0208116 | A1* | 7/2017 | Schilit et al. | H04L 67/025 |
| 2018/0184268 | A1* | 6/2018 | Stitt et al. | H04W 4/38 |
| 2021/0092578 | A1* | 3/2021 | Ryn et al. | H04W 4/80 |

OTHER PUBLICATIONS (CN 106162529 B) >>> Indoor Positioning Method And device (see title) (Year: 2020).*
(CN 108541378 B) >>> Service Sharing Apparatus And Method (see title) (Year: 2021).*
(KR 20220042010 A) >>> Voice Processing System Including Voice Processing Device And Terminal (see title) (Year: 2022).*

* cited by examiner

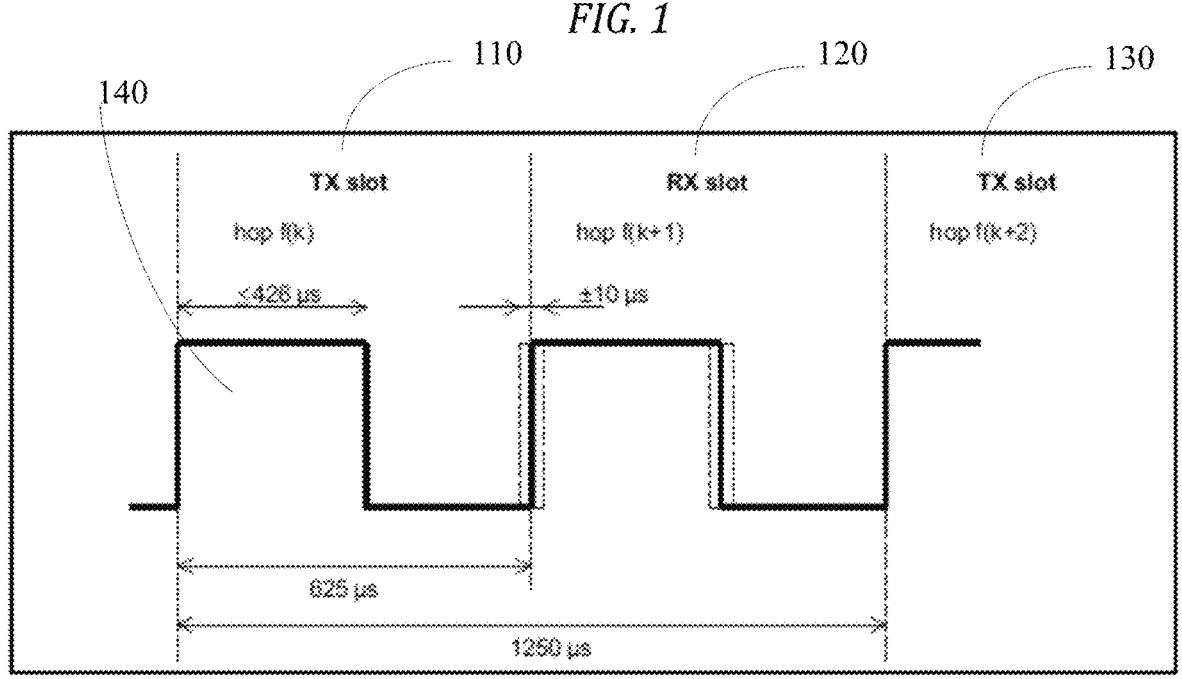
*RX/TX cycle of master transceiver in normal mode for single-slot packets*
Prior Art
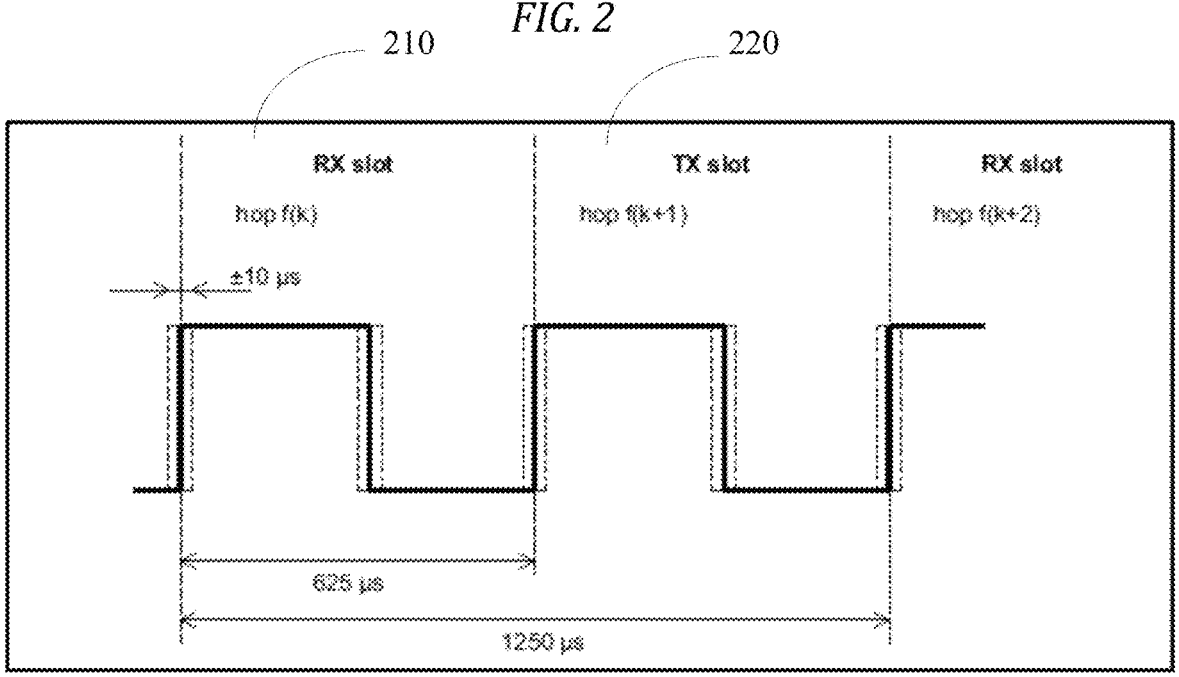
*RX/TX cycle of slave transceiver in normal mode for single-slot packets*
Prior Art

*Prior Art*

*FIG. 5*

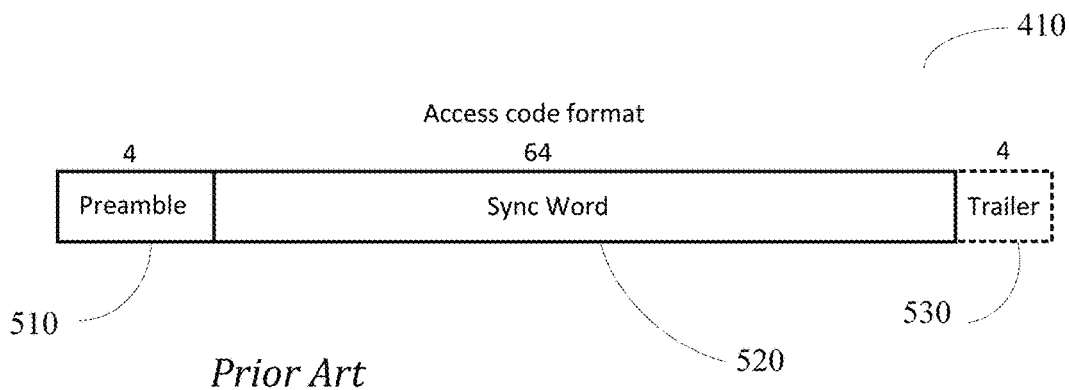

*Prior Art*

*FIG. 6*

| Step | Message | Packet Type | Direction | Hopping Sequence | Access Code and Clock |
|---|---|---|---|---|---|
| 1 | Page | ID | Master to Slave | Page | Slave |
| 2 | First slave page response | ID | Slave to Master | Page response | Slave |
| 3 | Master page response | FHS | Master to Slave | Page | Slave |
| 4 | Second slave page response | ID | Slave to Master | Page Response | Slave |
| 5 | 1st packet master | POLL | Master to Slave | Channel | Master |
| 6 | 1st packet slave | Any type | Slave to Master | Channel | Master |

FIG. 9

| | Chan | TYPE | Role | LMP Opcode | TOA | Delta Time | Shift Time |
|---|---|---|---|---|---|---|---|
| | | | | ← 910 911 912 913 914 915 916 | | | |
| | 0 | ID | | | 2806496 | 0 | 0 |
| | 0 | ID | | | 2806808 | 0312 | 312 |
| 920 | 0 | ID | | | 2807122 | 0314 | 626 |
| 921 | 69 | FHS | Master | | 2807746 | 0624 | 1250 |
| 922 | 58 | POLL | Master | | 2810246 | 2500 | 3750 |
| | 49 | NULL | Slave | | 2810873 | 0627 | 4377 |
| 925 | 3 | POLL | Master | | 2813996 | 3123 | 7500 |
| | 66 | DM1 | Master | features_req | 2815246 | 1250 | 8750 |
| 930 | 50 | DM1 | Master | | 2816496 | 1250 | 10000 |
| | 63 | DM1 | Slave | features_res | 2817122 | 0626 | 10626 |
| | 74 | POLL | Master | | 2817746 | 0624 | 11250 |
| 935 | 15 | POLL | Master | | 2818996 | 1250 | 12500 |
| | 7 | DM1 | Master | features_req_ext | 2820246 | 1250 | 13750 |
| | 55 | NULL | Slave | | 2820872 | 0626 | 14376 |
| 936 | 62 | POLL | Master | | 2821496 | 0624 | 15000 |
| 937 | 54 | POLL | Master | | 2822746 | 1250 | 16250 |
| 938 | 31 | POLL | Master | | 2823996 | 1250 | 17500 |
| 939 | 23 | POLL | Master | | 2825246 | 1250 | 18750 |
| 940 | 78 | POLL | Master | | 2826496 | 1250 | 20000 |
| | 65 | DM1 | Slave | features_res_ext | 2827123 | 0627 | 20627 |
| | 70 | POLL | Master | | 2827746 | 0623 | 21250 |
| 945 | 57 | NULL | Slave | | 2828373 | 0627 | 21877 |
| | 17 | DM1 | Master | features_req_ext | 2828996 | 0623 | 22500 |
| | 0 | NULL | Slave | | 2829622 | 0626 | 23126 |
| 950 | 9 | POLL | Master | | 2830246 | 0624 | 23750 |
| 951 | 71 | DM1 | Slave | features_res_ext | 2830873 | 0627 | 24377 |
| 952 | 64 | POLL | Master | | 2831496 | 0623 | 25000 |
| 955 | 77 | NULL | Slave | | 2832123 | 0627 | 25627 |
| | 56 | DM1 | Master | name_req | 2832746 | 0623 | 26250 |
| | 69 | NULL | Slave | | 2833372 | 0626 | 26876 |
| 960 | 33 | POLL | Master | | 2833996 | 0624 | 27500 |
| | 4 | DM1 | Slave | name_res | 2834623 | 0627 | 28127 |
| | 25 | POLL | Master | | 2835246 | 0623 | 28750 |
| 965 | 75 | NULL | Slave | | 2835873 | 0627 | 29377 |
| | 1 | DM1 | Master | detach | 2836496 | 0623 | 30000 |
| | 2 | NULL | Slave | | 2837122 | 0626 | 30626 |
| | 72 | POLL | Master | | 2837746 | 0624 | 31250 |
| | 73 | NULL | Slave | | 2838373 | 0627 | 31877 |
| | 13 | POLL | Master | | 2838996 | 0623 | 32500 |
| | 47 | NULL | Slave | | 2839623 | 0627 | 33127 |
| | 5 | POLL | Master | | 2840246 | 0623 | 33750 |
| | 39 | NULL | Slave | | 2840873 | 0627 | 34377 |
| | 60 | POLL | Master | | 2841496 | 0623 | 35000 |

| | 912 | 916 | 915 | 1010 |
|---|---|---|---|---|
| | Role | Shift Time | Delta Time | Shift Time MOD 1250 |
| | Master | 1250 | 624 | 0 |
| | Master | 3750 | 2500 | 0 |
| | Slave | 4377 | 627 | 627 |
| | Master | 7500 | 3123 | 0 |
| | Master | 8750 | 1250 | 0 |
| | Master | 10000 | 1250 | 0 |
| 1020 | Slave | 10626 | 626 | 626 |
| 1021 | Master | 11250 | 624 | 0 |
| | Master | 12500 | 1250 | 0 |
| | Master | 13750 | 1250 | 0 |
| 1025 | Slave | 14376 | 626 | 626 |
| | Master | 15000 | 624 | 0 |
| | Master | 16250 | 1250 | 0 |
| | Master | 17500 | 1250 | 0 |
| | Master | 18750 | 1250 | 0 |
| | Master | 20000 | 1250 | 0 |
| 1027 | Slave | 20627 | 627 | 627 |
| | Master | 21250 | 623 | 0 |
| 1030 | Slave | 21877 | 627 | 627 |
| 1031 | Master | 22500 | 623 | 0 |
| | Slave | 23126 | 626 | 626 |
| | Master | 23750 | 624 | 0 |
| | Slave | 24377 | 627 | 627 |
| | Master | 25000 | 623 | 0 |
| | Slave | 25627 | 627 | 627 |
| | Master | 26250 | 623 | 0 |
| | Slave | 26876 | 626 | 626 |
| | Master | 27500 | 624 | 0 |
| | Slave | 28127 | 627 | 627 |
| | Master | 28750 | 623 | 0 |
| | Slave | 29377 | 627 | 627 |
| | Master | 30000 | 623 | 0 |
| | Slave | 30626 | 626 | 626 |
| | Master | 31250 | 624 | 0 |
| | Slave | 31877 | 627 | 627 |
| | Master | 32500 | 623 | 0 |
| | Slave | 33127 | 627 | 627 |
| | Master | 33750 | 623 | 0 |
| | Slave | 34377 | 627 | 627 |
| | Master | 35000 | 623 | 0 |

IDENTIFICATION AND LOCATION OF MULTIPLE PERSONAL AREA NETWORK DEVICES

CROSS-REFERENCE TO RELATED APPLICATION

This application is related to and claims priority to U.S. Provisional Patent Application Ser. No. 63/151,230, filed Feb. 19, 2021, entitled IDENTIFICATION AND LOCATION OF MULTIPLE PERSONAL AREA NETWORK DEVICES, the entirety of which is incorporated herein by reference.

TECHNICAL FIELD

The present disclosure relates to wireless communications, and in particular to methods and devices for the discovery and geo-location of Un-Discoverable Classic Bluetooth Basic Rate (BR) devices.

BACKGROUND

The Bluetooth system is specified in "Specification of the Bluetooth® System, Covered Core Package Version: 5.0, Publication Date: Dec. 6, 2016 ("Specification of the Bluetooth® System"). Bluetooth operates in the unlicensed Industrial, Scientific, and Medical (ISM) band from 2.400 to 2.4835 GHz. Classic Bluetooth Basic Rate (BR) and Bluetooth Low Energy (BLE) employ Gaussian Frequency-Shift Keying (GFSK) as the primary modulation scheme, while Classic Bluetooth Enhanced Data Rate (EDR) incorporates differential phase-shift keying (DPSK) for increased throughput. BR may occupy any of 79 radio frequency (RF) channels, spaced by 1 MHz, whereas BLE is limited to 40 RF channels, spaced by 2 MHz. For both BR and BLE, the nominal channel symbol rate is 1 MHz, with a nominal channel symbol duration of 1 μs.

A more complete understanding of the present embodiments, and the attendant advantages and features thereof, will be more readily understood by first describing relevant Bluetooth system details. Relevant details of the Bluetooth system are therefore presented herein. A more complete description can be obtained by reference to the Specification of the Bluetooth® System, the entirety of which is incorporated herein by reference.

Bluetooth is a time division multiplex (TDM) system that includes a "Master" device, which initiates an exchange of data, and a "Slave" device which responds to the Master. The TDM slot duration is 625 μs, and the maximum payload length is such that certain packet types may extend up to five slots in length. Each device will hop to an RF channel once per packet and Slave devices will utilize the timing of their Master to hop in synchronization.

There are two basic types of data packets and links: Asynchronous Connectionless (ACL) and Synchronous Connection Oriented (SCO). ACL is used for data communications with just one ACL link per device pair. SCO is used for real time audio links, and each device may support up to 3 SCO links at one time.

FIG. 1 is a diagram of a typical receive/transmit (RX/TX) cycle 100 for the master transceiver in normal mode for single-slot packets. Each TX slot and RX slot is of duration 625 μs. The master transceiver transmits in TX slot 110 on hop channel f(k) and is followed by the RX slot 120, on hop channel f(k+1). The master then transmits in the next slot 130 on hop channel f(k+2). The time between consecutive TX slots and RX slots is therefore 1250 μs. FIG. 2 is a diagram of the typical corresponding RX/TX cycle 200 of the slave transceiver. The slave transceiver receives during slot 210, on hop channel f(k) and transmits on hop channel f(k+1) 220. The duration of the transmitted packet 140 is less than or equal to 426 μs. The Bluetooth physical channel is characterized by the combination of a pseudo-random frequency hopping sequence, the specific slot timing of the transmissions, the access code and the packet header encoding. The basic piconet channel is used for communication between connected devices and is characterized by a unique pseudo-random frequency hopping sequence determined by the Bluetooth clock of the master.

FIG. 3 is a diagram that shows the format of the unique Bluetooth Device Address (BD_ADDR) 300. The BD_ADDR 300 is split into three parts, lower address part (LAP) 310, upper address part (UAP) 320, and non-significant address part (NAP) 330. In order to establish a connection to a Bluetooth device only the UAP and LAP are required. The NAP is informative and devices often use a default NAP to establish connectivity.

FIG. 4 is a diagram that shows the general format 400 for the Classic Bluetooth BR packet type. Every packet starts with an Access Code 410. If a packet header follows, the access code is 72 bits long, otherwise the access code is 68 bits long and is known as a shortened access code. For any packet not comprised solely of a shortened Access Code, the Access Code 410 is followed by a 54-bit GFSK Packet Header 420, which is generated by encoding an 18-bit information field using a rate 1/3 repetition code. The Header 420 is followed by the payload 430

FIG. 5 is a diagram showing a format of the Access Code 410. The Access Code is used for synchronization and identification and the Access Code identifies all packets exchanged on a physical channel. The Access Code 410 begins with a 4-bit preamble 510 (either 0101 or 1010), and, for non-shortened Access Codes, ends with a 4-bit trailer 530 (also either 0101 or 1010). The 4-bit preamble 510 is followed by the Sync Word 520. The Sync Word 520 is a 64-bit code word derived from a 24-bit LAP. For device access codes (DACs), the slave LAP is used, and for channel access codes (CACs), the master LAP is used. The DAC is used during paging and the CAC is used for all packets exchanged on the piconet physical channel.

The location of wireless devices can be performed by various methods. These methods may be classified as active, passive and combined active and passive. In an active location scheme, a device that is determining the location or range, the measuring device, transmits certain packets to the device being located, the target device, and the common method is to measure the time of arrival (TOA) of the response from the target device and compare that to the time of departure (TOD) that the packet was transmitted by the measuring device so as to determine the time for the round trip (RTT). TOD may be measured for a packet that is transmitted from the measuring station addressed to the target station. The TOA of the response from the target station, at the measuring station, is then also measured. If the turnaround time for the target station to receive the packet from the measuring station and to start to transmit the response is known, then the time difference at the measuring station between the TOA and the TOD, minus the turnaround time at the target station will be directly proportional to twice the distance of the target station from the measuring station. For example, if the target station is a wireless device based upon Bluetooth technology, and if the packet transmitted from the measuring station, i.e., the Master, to the target station, i.e., the Slave, is a Poll packet, the response from the target station will generally be a Null packet. The effective turnaround time at the target station will be the nominal 625 μs slot time. Hence, the time delay, td, between the measuring station and the target station may be determined from the calculation td=(TOA−TOD−Slot Time)/2 and the distance between the measuring station and the target station is then td×c, where c is the speed of light. This method of estimating the distance to a target station by measuring the TOD and TOA and accounting for the turnaround time is known in the art.

In order to geo-locate a Bluetooth device by measuring the time delay td, a series of packet exchanges may be utilized. In the general sense this requires a regular establishment across several connection layers with security, pairing, and encryption.

SUMMARY

A method and Bluetooth mobile device are disclosed for geo-locating a plurality of target Bluetooth devices. In some embodiments, a method includes, for each of a plurality of target Bluetooth devices in turn: establishing communications with the target Bluetooth device by transmitting at least one paging packet, each paging packet including an Access Code derived from a lower address part (LAP) of the target Bluetooth device; transmitting a plurality of packets to the target Bluetooth device, each packet including an Access Code derived from an LAP of the master Bluetooth device, the LAP being unique to the target Bluetooth device; and receiving a plurality of response packets from the target Bluetooth device, each received response packet having an Access Code derived from the LAP of the master Bluetooth device. The method also includes distinguishing between time delays associated with received response packets from the different target Bluetooth devices based at least in part on Access Codes derived from the unique LAPs of the received response packets; and determining a location for each of the plurality of target Bluetooth devices based at least in part on the time delay associated with the response packet received from the target Bluetooth device.

In some embodiments, the lower address part of the plurality of paging packets are determined by a counter. In some embodiments, a time delay associated with a response packet received from a target Bluetooth device is determined based at least in part on a shift time, the shift time being a time of detection of the response packet relative to a time of detection of a first received response packet of the plurality of received response packets. In some embodiments, the time delay associated with the response packet received from the target Bluetooth device is determined according to: $t_d$=(shift time, MOD (2×slot time)−slot time)/2, wherein (shift time, MOD (2×slot time))>slot time, and slot time is a Bluetooth time division multiplex (TDM) slot duration. In some embodiments, a received response packet is a NULL packet. In some embodiments, determining a location for at least one of the plurality of target Bluetooth devices includes simultaneously determining locations of a plurality of target Bluetooth devices from which response packets are received. In some embodiments, only received response packets having an upper address part with an address of the master Bluetooth mobile device are included in distinguishing between time delays. In some embodiments, distinguishing between time delays includes sorting the time delays in order of time of detection. In some embodiments, only time delays associated with response packets received within a time window are sorted. In some embodiments, the method includes transmitting a data message to a target Bluetooth device indicating that a Link Management Protocol (LMP)_Detach packet has been transmitted.

According to another aspect, a master Bluetooth mobile device is configured to communicate with a plurality of target Bluetooth devices. The master Bluetooth mobile device includes: a radio interface configured to, for each of a plurality of target Bluetooth devices in turn: establish communications with the target Bluetooth device by transmitting at least one paging packet, each paging packet including an Access Code derived from a lower address part (LAP) of the target Bluetooth device; transmit a plurality of packets to the target Bluetooth device, each packet including an Access Code derived from an LAP of the master Bluetooth device, the LAP being unique to the target Bluetooth device; and receive a plurality of response packets from the target Bluetooth device, each received response packet having an Access Code derived from the LAP of the master Bluetooth device. The master Bluetooth device also includes processing circuitry in communication with the radio interface, the processing circuitry configured to: distinguish between time delays associated with received response packets from the different target Bluetooth devices based at least in part on Access Codes derived from the unique LAPs of the received response packets; and determine a location for each of the plurality of target Bluetooth devices based at least in part on the time delay associated with the response packet received from the target Bluetooth device.

In some embodiments, the lower address part of the plurality of paging packets are determined by a counter. In some embodiments, a time delay associated with a response packet received from a target Bluetooth device is determined based at least in part on a shift time, the shift time being a time of detection of the response packet relative to a time of detection of a first received response packet of the plurality of received response packets. In some embodiments, the time delay associated with the response packet received from the target Bluetooth device is determined according to: $t_d$=(shift time, MOD (2×slot time)−slot time)/2, wherein (shift time, MOD (2×slot time))>slot time, and slot time is a Bluetooth time division multiplex (TDM) slot duration. In some embodiments, a received response packet is a NULL packet. In some embodiments, determining a location for at least one of the plurality of target Bluetooth devices includes simultaneously determining locations of a plurality of target Bluetooth devices from which response packets are received. In some embodiments, only received response packets having an upper address part with an address of the master Bluetooth mobile device are included in distinguishing between time delays. In some embodiments, distinguishing between time delays includes sorting the time delays in order of time of detection. In some embodiments, only time delays associated with response packets received within a time window are sorted. In some embodiments, the radio interface is further configured to transmit a data message to a target Bluetooth device indicating that a Link Management Protocol (LMP)_Detach packet has been transmitted.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 is a diagram of the receive/transmit (RX/TX) cycle for the master transceiver in normal mode for single-slot packets;

FIG. 2 is a diagram of the receive/transmit (RX/TX) cycle of the slave transceiver;

FIG. 5 is a diagram showing the Access Code format;

FIG. 6 is a table of the initial messaging between a master and a slave during start up for the paging substates;

FIG. 9 is an example table of the protocol capture of the packet exchanges described above with reference to FIG. 8 where the protocol analyzer is located in the same general proximity, e.g., at the same location, as the Master;

FIG. 10 is a table derived from the example table in FIG. 9;

DETAILED DESCRIPTION

This Application incorporates U.S. Pat. No. 10,771,927 B1 by reference in its entirety. Method and devices are disclosed that simultaneously geo-locate a number of BR Bluetooth devices using a single measuring station.

A more complete understanding of the present embodiments, and the attendant advantages and features thereof, will be more readily understood by first describing a basic method for geo-locating a Bluetooth device without the need for any user interaction.

Figure 3:
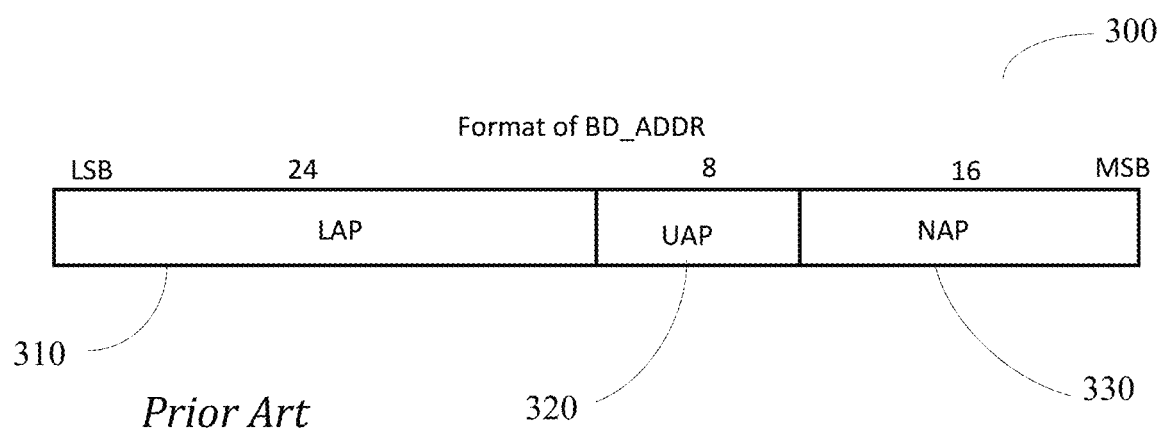
FIG. 3 is a diagram that shows the format of the unique Bluetooth Device Address (BD_ADDR)
Figure 4:
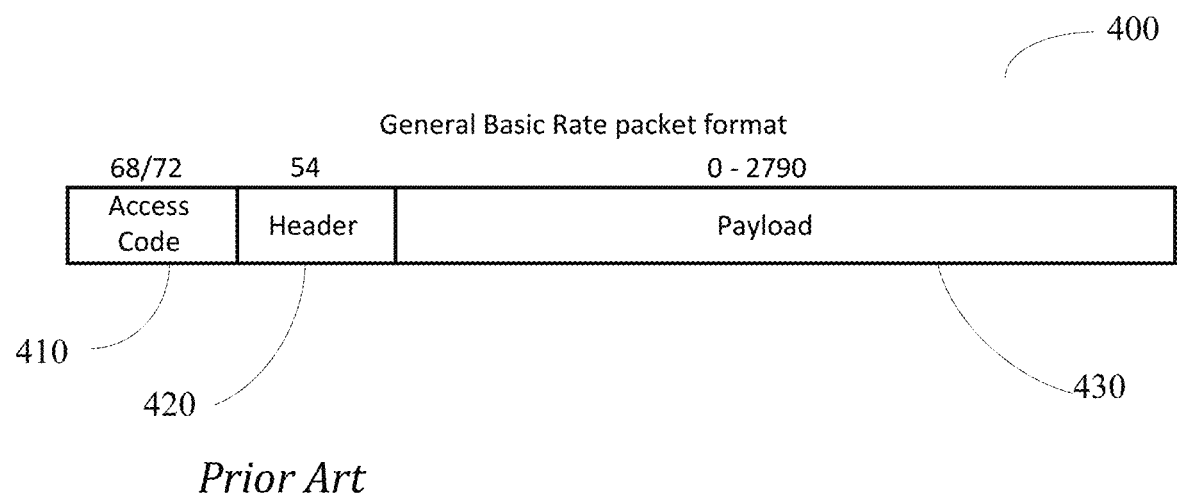
FIG. 4 is a diagram that shows the general format for the Classic Bluetooth BR packet type.

The default state of a Bluetooth device is the Standby state. In this state, the device may be in a low-power mode. A device may leave the Standby state to scan for page or inquiry messages or to page or inquire itself. In order to establish new connections, the paging procedure or the synchronization scan procedure is used. Only the Bluetooth device address, BD_ADDR 300, as discussed above with reference to FIG. 3, is required to set up a connection using the paging procedure. A device that establishes a connection using a page procedure will automatically become the master of the connection.

Once the connection has been established, packets may be sent back and forth, and each device uses the basic or adapted channel hopping sequence. A device can transition to the Connection state from the page/page scan substates and starts with a Poll packet, sent by the master that verifies the switch to the master's timing and channel frequency hopping.

A device can scan for page messages from the Standby state or the Connection state. When a device leaves the Standby mode to scan for page messages it selects the scan frequency according to the page hopping sequence determined by the device's BD_ADDR.

Referring again to the drawing figures, in which like reference designators refer to like elements, FIG. 6 is a table 600 of the initial messaging between a master and a slave during start up for the paging substates. In step 1, 601, the master device is in the "page" substate and the slave device is in the "page scan" substate. It is assumed that in this step 601 that the page message sent by the master is received correctly by the slave. On receiving the page message, in step 2, 602, the slave device transmits a slave page response message (the slave's device access code) and enters the "slave response" substate. The master waits for a reply from the slave and when this arrives in step 2, 602, the master enters the "master response" substate in step 3, 603. In step 3, 603, the slave awaits the arrival of a Frequency Hopping Sequence (FHS) packet from the master and if it is received, in step 4, 604, then the slave responds with a slave page response message to acknowledge the reception of the FHS packet. During the initial message exchange, steps 1 to 4, 601 to 604, all parameters are derived from the slave's device address, BD_ADDR, and only the page hopping and page response hopping sequences are used (derived from the slave's device address, BD_ADDR).

Finally, in step 5, 605, the slave device enters the Connection state and the slave device uses the master's clock and the master's BD_ADDR to determine the basic channel hopping sequence and channel access code. The FHS packet in step 3, 603, contains all the information for the slave to construct the channel access code, CAC, and the Access Code 410 in each packet is then derived from the LAP 310 of the master. The connection mode starts with a Poll packet transmitted by the master in step 5, 605, and the slave, in step 6, 606, may reply with any type of packet but a Null packet is generally used for this response.

Figure 7:
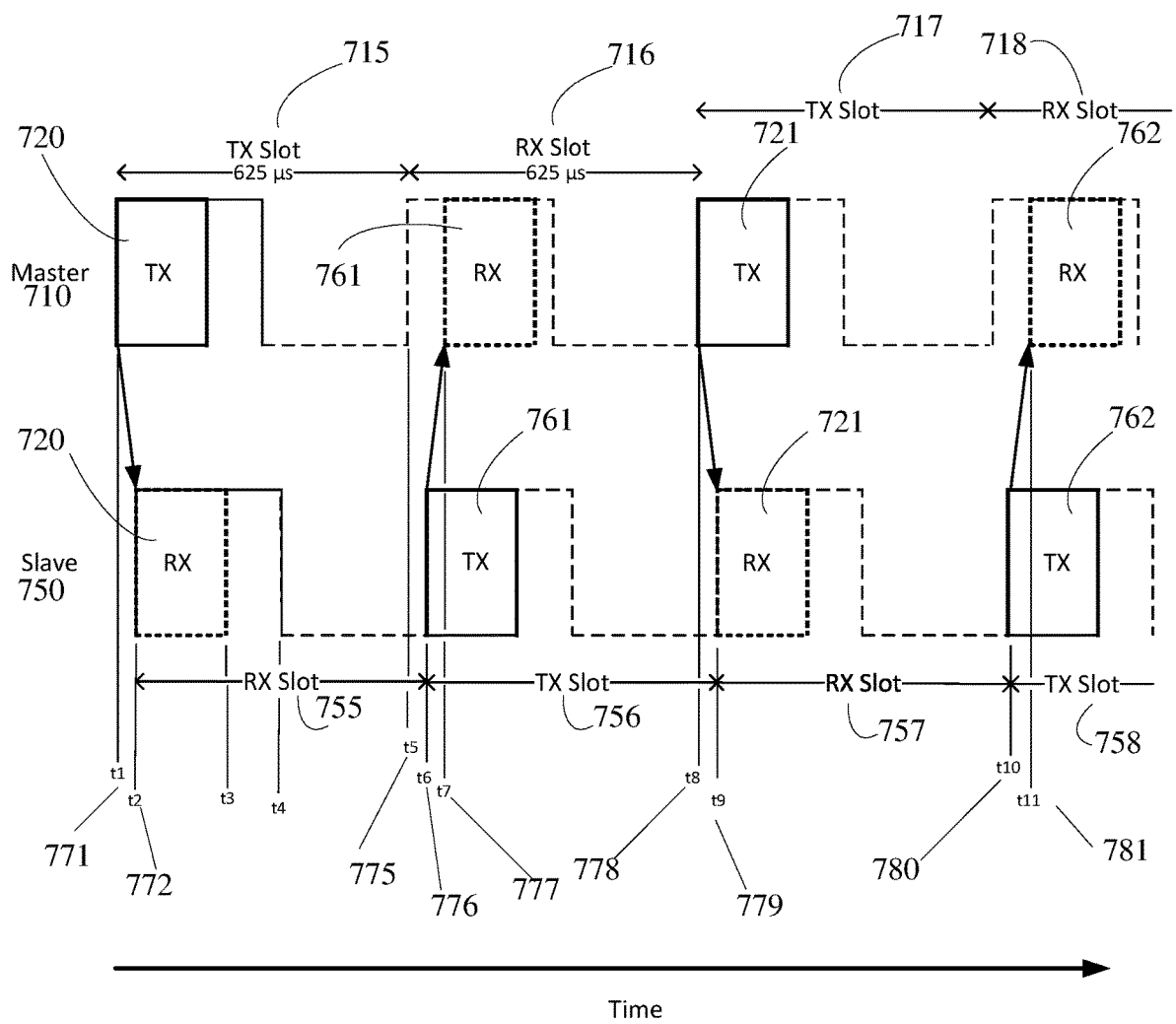
FIG. 7 is a timing diagram that describes the ranging method of the present disclosure that may be used to determine the distance between two Bluetooth devices.

FIG. 7 is a timing diagram that describes the ranging method of the present disclosure that may be used to determine the distance between two Bluetooth devices, a Master device 710 (also referred to herein as "Master 710") and a Slave device 750 (also referred to herein as "Slave 750"). The Master 710 has a TX Slot 715 followed by an RX Slot 716, each nominally 625 µs in duration. The TX Slot 715 starts at time t1 771 and the RX Slot 716 starts at time t5 775. Conversely the Slave 750 has an RX Slot 755 followed by a TX Slot 756, each nominally 625 µs in duration. The RX Slot 755 starts at time t2 772 and the TX slot starts at time t6 776. At time t1 771, the Master 710 may transmit a packet 720 to the Slave 750. This transmission packet 720 may be received at the Slave 750 at time t2 772. The time (t2-t1) is the propagation time of the packet 720 in travelling the distance between the Master 710 and the Slave 750. The Slave 750 may then respond to packet 720 with packet 761 in its next TX slot 756 at time t6 776. This packet 761 may be received by the Master 710 at time t7 777 in the corresponding RX Slot 716 of the Master 710. The time (t7-t6) is also the propagation time of the packet 761 in travelling the distance between the Slave 750 and the Master 710. The time t1 771 is the TOD of packet 720 and the TOA of the response packet 761 is t7 777. The turnaround time is (t6-t2), the slot time of the Slave 750, nominally 625 µs. Hence, the time delay, td, which is equal to (t2-t1) and (t7-t6), between the Master 710 and the Slave 750 may be determined from the calculations:

$$td=[t7-t1-(t6-t2)]/2 \text{ or } td=(TOA-TOD-\text{Slot Time})/2 \quad (1)$$

and the distance between the Master 710 and the Slave 750 is then td×c, where c is the speed of light. The delta time (t7−t1) or (TOA−TOD) corresponds to the time that the Master 710 receives packet 761 minus the time that the Master 710 transmitted packet 720.

At time t8 778, at the start of the Master's next TX slot 717, another packet 721 may be transmitted by the Master 710 to the Slave 750. This packet may be received by the Slave 750 at time t9 779 and at the start of the Slave's next TX slot 758, at time t10 780, the Slave 750 may transmit the response packet 762 to the Master 710, which may be received by the Master 710 at time t11 781. For this packet exchange 721 and 762, the time delay, td', which is equal to (t9-t8) and (t11-t10), between the Master 710 and the Slave 750 may be determined from the calculation $$td'=[t11-t8-(t10-t9)]/2, \qquad (2)$$

where t11 is the TOA of packet 762, t8 is the TOD of packet 721 and (t10-t9) is the Slot time of the Slave 750. The delta time (t11−t8) corresponds to the time that the Master 710 receives packet 762 minus the time that the Master 710 transmitted packet 721.

If the position of the Master is known, then by deriving values for td that result from the exchange of a number of packets between the Master 710 and the Slave 750, the distance from the Master 710 to the Slave 750 may be calculated. If the Master 710 moves in relation to the Slave 750, such that the distance from the Master 710 to the Slave 750 is calculated for varying angles between the two, e.g., the Master is in a vehicle or is airborne, then the location of the Slave may be calculated. Such methods for calculating a location based on a series of time delay measurements taken at varying angles between a master and slave are known in the art and are therefore not described herein.

The more packets that are exchanged between the Master 710 and the Slave 750, the better the accuracy of the calculated distance td×c. Basically, if the measuring error of td in each packet is Δt, then if there are N packet exchanges, the error is reduced by the square root of N. For example, if td is measured in microseconds, the maximum measurement error is ±1 μs. If td is measure over 100 packets, then the measurement error is reduced by 10, i.e., ±0.1 μs As described above with reference to FIG. 6, a targeted Bluetooth device may be paged by another Bluetooth device. The targeted Bluetooth device will act as the Slave 750 and the Bluetooth device that initiates the page acts as the Master 710. Once the sequence of exchanges as described above with reference to FIG. 6 has completed, i.e., once the master transmits the Poll packet in step 5 605, then a brief temporary connection, a piconet, may occur.

As discussed above with reference to FIG. 7, in order to measure the distance between two Bluetooth devices, a sufficient number of packets may be required to be exchanged in order to produce a required accuracy.

Figure 8:
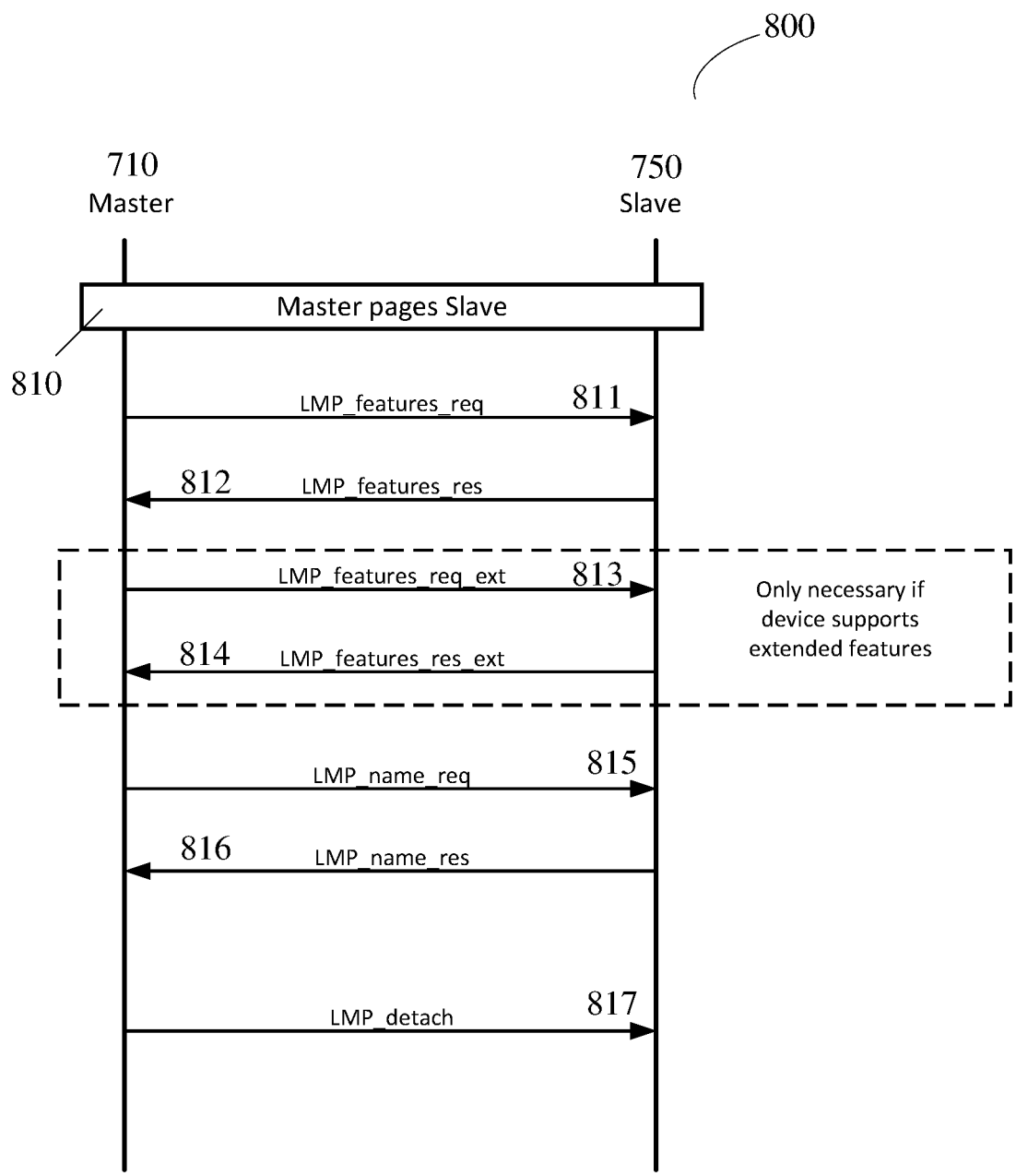
FIG. 8 is a diagram describing the sequence of packet exchanges between a Master and a Slave when the Master uses an LMP Name Request connection.

FIG. 8 is a diagram describing the sequence 800 of packet exchanges between a Master 710 and a Slave 750 when the Master 710 uses a Link Manager Protocol (LMP) Name Request connection. The sequence 800 starts 810 when the Master 710 pages the Slave 750 as discussed above with reference to FIG. 6. Upon receipt of a packet, step 606, from the Slave 750, the Master 710 may transmit an LMP_features_req request packet, 811, to the Slave 750. The Slave 750 may then respond with an LMP_features_res response packet 812. If extended features are supported, then an exchange of LMP_feature_req_ext 813 and LMP_feature_res_ext 814 request and response packets may take place. The Master 710 may then transmit an LMP_name_req request packet 815 and the Slave 750 may respond with an LMP_name_res response packet 816. After receiving the LMP_name_res response packet 816, the Master 710 may transmit an LMP_detach packet 817 to disconnect.

During the exchange of packets described above with reference to FIG. 8, in order to maintain the channel hopping sequence and synchronization, in addition to the packets 811 to 817, the Master 710 and the Slave 750 may transmit Poll packets and Null packets respectively. A Bluetooth protocol analyzer may be used to capture the Bluetooth packets. In practice, such a protocol analyzer cannot be relied upon to capture every packet and allowance may be made accordingly. During this exchange of packets described above with reference to FIG. 8, the Access Code 410 of each packet is derived from the lower address part (LAP) 310 of the Master 710.

FIG. 9 is an example table 900 of the protocol capture of the packet exchanges described above with reference to FIG. 8 where the protocol analyzer is located in the same general proximity, e.g., at the same location as the Master 710. Column 910 displays the channel number. Column 911 displays the packet type. Column 912 displays the device, Master 710 or Slave 750 that transmitted the packet. Column 913 displays the packet description of the transmitted packet. Column 914 displays the time that the packet was received, TOA. Column 915 displays the delta time, which is the time that the present packet was detected after the time of the previously detected packet. The shift time column 916 is the time that the present packet was received after the first received packet. At line 920, the FHS packet is displayed that corresponds to the Step 3 603 of the paging sequence discussed above with reference to FIG. 6. At line 921, the Poll packet is displayed that corresponds to Step 5, 605, of the paging sequence described above with reference to FIG. 6. At line 922, the Slave 750 responds with a Null packet. At lines 925, 930, 935/945, 940/950, 955, 960, and 965, the LMP packet descriptions corresponding to packets 811, 812, 813, 814, 815, 816, and 817, are displayed. As discussed above with reference to FIG. 8, several Poll packets transmitted by the Master 710, and Null packets transmitted by the Slave 750, are also displayed. For example, at lines 951 and 952, a Poll packet transmitted by the master on channel 64 is followed by a Null packet transmitted by the slave, respectively. The corresponding delta time, column 915 at line 952, is 627 μs. As discussed above with reference to FIGS. 1 and 2, this delta time relates to the nominal 625 μs slot times 110 and 220. At lines 936, 937, 938, and 939, Poll packets transmitted by the master were detected and displayed. The corresponding delta times at column 915 lines 936, 937, 938 and 939, are each 1250 μs. As discussed above with reference to FIG. 1, the delta time of 1250 μs relates to the 1250 μs time between TX slots 110 and 130. It may be noted that no corresponding Null packets to Poll packets from the slave at lines 936, 937, 938, and 939 were transmitted or detected.

As discussed above with reference to FIG. 7 and FIG. 9, the delta time readings will be in accordance with the time slots and the distance of the Slave 750 from the Master 710. All the packet types leading up to an LMP_name_req request packet 815 and the LMP_name_res response packet 816 are all single slot packets. Hence, the time deltas ideally would be the slot time, nominally 625 μs, plus twice the propagation time, as discussed above with reference to FIG. 7.

FIG. 10 is a table 1000 derived from the example table 900 in FIG. 9. The columns, Role 912, Shift Time column 916 and Delta Time column 915, in μs, are as shown in FIG. 9. Lines 1020 and 1021 both refer to packets transmitted by the Master 710. The delta time for line 1020 is 624 μs whereas the delta time for line 1021 is 1250 µs. Line 1030 refers to a packet transmitted by the Master 710 and line 1031 refers to a packet transmitted by the Slave 750. In line 1030 the delta time is 623 µs and in line 1031 the delta time is 626 µs. It is not possible to distinguish between packets transmitted by the Master 710 or the Slave 750 by reference to the delta time. In order to distinguish between packets that were transmitted by the Master 710 or the Slave 750, the shift time modulus (MOD 1250), is calculated. The shift time modulus 1250, is shown in column 1010. In column 1010, lines 1020, 1021, and 1030, the value is 0, indicating that the packet was transmitted by the Master 710, whereas in column 1010 lines 1025, 1027, and 1031 the value is nominally the slot time plus twice the propagation time, indicating that the packet was transmitted by the Slave 750. Hence, the propagation time, td, may be calculated from the values as given in column 1010:

$$td = (\text{Shift Time MOD } (1250) - \text{slot time})/2 \qquad (3)$$

where Shift Time MOD (1250)>slot time

As discussed above with reference to FIG. 6, the Master 710 first pages the Slave 750. The Master 710 then sends an FHS packet to the Slave 750, which effectively sets up a piconet between the Master 710 and the Slave 750. Then, as discussed above with reference to FIG. 8, the Master 710 initiates an exchange of packets using LMP_features and LMP_name requests. As discussed above with reference to FIG. 9, this causes a number of NULL packets to be transmitted by the Slave 750 to the Master 710 in response to Polls from the Master 710. Then, as discussed above with reference to FIGS. 7 and 10, the individual RTTs for each of the received NULL packets can be measured for that exchange of Polls and Nulls for that particular slave.

The above description describes the measurement of the propagation time td between a Master 710 and a Slave 750. The Slave 750 may also be referred to as a "target device" herein, and in the following descriptions a "target device" is a Slave 750. Thus, reference to target devices is understood to mean that geo-location is being performed for multiple Slave 750 devices.

If more than one target device, i.e., Slave 750, is to be geo-located, then the sequence of paging, LMS_features and LMS_name, may be repeated for each of the target devices, i.e., for each Slave 750, and individual td or RTTs measured for each target device, for each sequence. In each case, the access code 410 of each Null packet transmitted by the target device will include the Sync Word 520, which is derived from the LAP 310 of the Master 710. Hence, all Null packets from any target device will use the LAP of the Master 710 for the Access Code, and in the case that the BD_ADDR of the Master 710 is unchanged, there is no difference between the formats of the Nulls from different target devices that identifies that Null with a particular target device.

As discussed below with reference to FIG. 12, if the BD_ADDR and in particular, the LAP 310 of the Master 710 is changed such that a particular LAP is used for a particular target device, then it is possible to distinguish the td or RTTs between different target devices.

Figure 11:
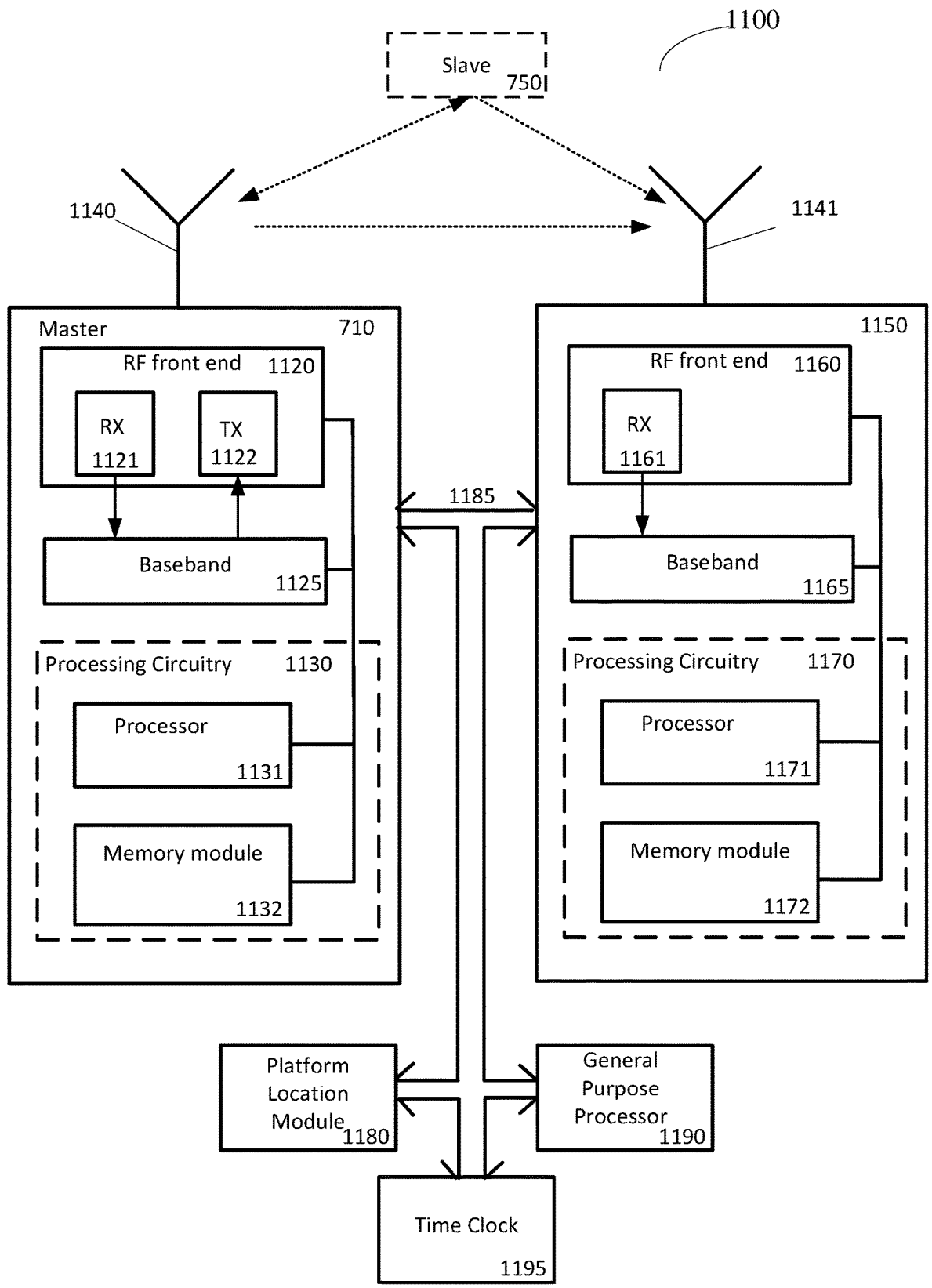
FIG. 11 illustrates a block diagram of an example wireless communication system which, according to an embodiment of the disclosure, may be configured to perform the functions described herein.

FIG. 11 illustrates a block diagram of an example wireless communication system 1100 which, according to an embodiment of the disclosure, may be configured to perform the functions described herein. In some embodiments described herein, a wireless communication system 1100 includes the Master 710 that operates as a wireless transmitter/receiver, and a wireless receiver 1150 that performs the functions of a Bluetooth protocol analyzer as discussed above with reference to FIGS. 7, 8 and 9. Master 710 may be any device configured to wirelessly receive signals and transmit signals, and may be configured to execute any of the methods of the Bluetooth Specification. Wireless receiver 1150 may be any device configured to wirelessly receive signals, and may be configured to execute any of the methods of the Bluetooth Standard. The wireless communication system 1100 may also include a general purpose processor 1190 and a time clock 1195 which are interconnected to the Master 710 and wireless receiver 1150 by a data bus 1185.

In some embodiments, the Master 710 includes an RF front end 1120 that includes an RF transmitter 1122 and an RF receiver 1121, a baseband processor 1125, and processing circuitry 1130 that includes processor 1131 and memory module 1132. The Master 710 also includes one or more wireless antennas such as antenna 1140. The RF receiver 1121 may perform the functions of low noise amplification, filtering and frequency down conversion for the reception of Bluetooth packets via the antenna 1140. The RF transmitter 1122 may perform the functions of up conversion and amplification for the transmission of Bluetooth packets via the antenna 1140. The baseband processor 1125 may perform the functions of modulation, de-modulation, coding and de-coding, as described in the Bluetooth Specification. In some embodiments, the processing circuitry 1130 and/or the processor 1131 may comprise integrated circuitry for processing and/or control, e.g., one or more processors and/or processor cores and/or Field Programmable Gate Arrays (FPGAs) and/or Application Specific Integrated Circuitry (ASICs) configured to execute programmatic software instructions. In some embodiments the some or all of the functions of the RF front end 1120 may be performed by the processing circuitry 1130. The processing circuitry 1130 may be configured to control any of the methods and/or processes described herein and/or to cause such methods, and/or processes to be performed, e.g., by the baseband processor 1125 and the RF front end 1120. The memory module 1132 may be configured to store data, programmatic software code and/or other information described herein. In some embodiments, the software may include instructions that, when executed by the processing circuitry 1130, causes the processing circuitry 1130 to perform the processes described herein with respect to the wireless transmitter/receiver, Master 710.

In some embodiments, more than one Master 710 may be present such that more than one target device may be located at a time by more than one Master 710.

In some embodiments, the wireless receiver 1150 includes an RF front end 1160 that includes an RF receiver 1161, a baseband processor 1165 and processing circuitry 1170 that includes a processor 1171 and a memory module 1172, and one or more wireless antennas such as wireless antenna 1141. The RF front end 1160 and RF receiver 1161 may perform the usual functions of an RF receiver front end such as low noise amplification, filtering and frequency down conversion so as to condition the received signal suitable for inputting to the baseband processor 1165. The baseband processor 1165 may perform the functions of demodulation and decoding so as to condition the received signal suitable for inputting to the processing circuitry 1170. In some embodiments the RF front end 1160 and/or the processing circuitry 1170 may comprise integrated circuitry for processing and/or control, e.g., one or more processors and/or processor cores and/or FPGAs and/or ASICs configured to execute programmatic software instructions. In some embodiments the functions of the RF receiver 1161 may be performed by the processing circuitry 1170. The processing circuitry 1170 may be configured to control any of the methods and/or processes described herein and/or to cause such methods, and/or processes to be performed, e.g., by the wireless receiver 1150. The memory module 1172 is configured to store data, programmatic software code and/or other information described herein. In some embodiments, the software may include instructions that, when executed by the processing circuitry 1170, causes the processing circuitry 1170 to perform the processes described herein with respect to the wireless receiver 1150.

In some embodiments, the wireless receiver 1150 may be configured to measure and monitor an input signal's attribute, such as may include one or more packets transmitted by Master 710 for the purpose of paging another device, such as slave 750, as discussed above with reference to FIG. 6. Further, the packets may include packets transmitted for the purpose of soliciting a remote name request, as discussed above with reference to FIGS. 8 and 9. Such packets may include Poll packets. Also, the wireless receiver 1150 may be configured to measure and monitor an input signal's attribute, such as may include one or more packets transmitted by another Bluetooth device, such as a Slave 750, that has been paged by the Master 710, as discussed above with reference to FIG. 6. Further, the packets may include packets transmitted by that other Bluetooth device in responding to the soliciting of a remote name request by the wireless transmitter/receiver of Master 710, as discussed above with reference to FIGS. 8 and 9. Such packets may include Null packets. The memory module 1172 may store instructions for executing any method mentioned in the Bluetooth Specification, input signals, and results of processing of the processor 1171 signals to be outputted and the like.

Wireless receiver 1150 may perform the functions of a protocol analyzer such as a Bluetooth protocol analyzer. In some embodiments, wireless receiver 1150, acting as a Bluetooth protocol analyzer, monitors, receives and decodes all Bluetooth packets on every channel. In some embodiments, wireless receiver 1150 may change channels in alignment with the Master 710, and only monitor, receive and decode packets on one communication channel or a subset of communication channels. In the cases where the wireless communication system 1100 includes more than one Master 710, and the system is used to simultaneously locate more than one target device, then the wireless receiver 1150 may monitor, receive and decode all Bluetooth packets on every channel.

According to an embodiment of the disclosure the RF transmitter/receiver master 710 may be configured to transmit and receive signals and the processing circuitry 1130 may be configured to prepare the transmitted and received signal attributes based upon the Bluetooth Specification. Such packets may include Null, Poll, FHS and DM1 packets that are to be transmitted and received by a wireless station that is based upon the Bluetooth Specification. The memory module 1132 may store instructions for executing any method mentioned in the specification, input signals, and results of processing of the processor 1131, signals to be outputted and the like.

To aid understanding of the present embodiments a Slave 750 is also shown in FIG. 11. Slave 750 is not an element of the example wireless communication system 1100. Slave 750 may receive transmissions from the Master 710, and transmissions from the Slave 750 may be received by the Master 710 and by the wireless receiver 1150.

According to another embodiment of the disclosure, the wireless receiver 1150 may be configured to receive the transmissions of another wireless communication device, and in particular a target device, i.e., Slave 750, and the processing circuitry 1170 may be configured to monitor an attribute of the Slave 750, and determine the value of the time of arrival of packets from the Slave 750. In addition, according to an embodiment of the disclosure the wireless receiver 1150 may be configured to measure the times of departure of the transmissions from the Master 710. These times may be accomplished by outputting a trigger that is timed to coincide with the reception packet from the other wireless device or the Master 710. This trigger may then be used to read the time from the time clock 1195. Time clock 1195 may have a precision that is higher than the internal timer that is part of the wireless receiver 1150.

According to an embodiment of the disclosure, a general purpose processor 1190 may be used to control the operations of the wireless communication system 1100 and in particular, the Master 710 and wireless receiver 1150. The general purpose processor 1190 may also carry out the various calculations as described in this disclosure and may also prepare the measurement results for disclosure to an operator or user. The general purpose processor 1190 may also be used by an operator or user to input one or more attributes of the packets transmitted by Master 710. For example, an operator may use the general purpose processor 1190 to set a particular BD_ADDR 300 for the Master 710, as described above with reference to FIG. 3. In some embodiments, the general purpose processor 1190 can be a computing device such as a tablet computer, desktop computer, laptop computer, or distributed computing, e.g. cloud computing. In some embodiments, the general purpose processor 1190 can be a processor/CPU in the tablet, laptop computer, desktop computer, or distributed computing environment, etc. In some embodiments the general purpose processor 1190 may comprise integrated circuitry for processing and/or control, e.g., one or more processors and/or processor cores and/or FPGAs and/or ASICs configured to execute programmatic software instructions and may include a memory module to execute programmatic code stored in the general purpose processor or another device. It is also noted that the elements of the general purpose processor 1190 can be included in a single physical device/housing or can be distributed among several different physical devices/housings. General purpose processor 1190 may be used to perform the various calculations as described in this disclosure and may also prepare the measurement results for disclosure to an operator or user.

According to an embodiment of the disclosure, a platform location module 1180 may be used to input, via the data bus 1185, to the general purpose processor 1190 and/or the processing circuitry 1170, the location of the platform that is carrying the wireless communication system 1100. The platform location module 1180 may comprise navigation equipment such as a GPS receiver.

Figure 12:
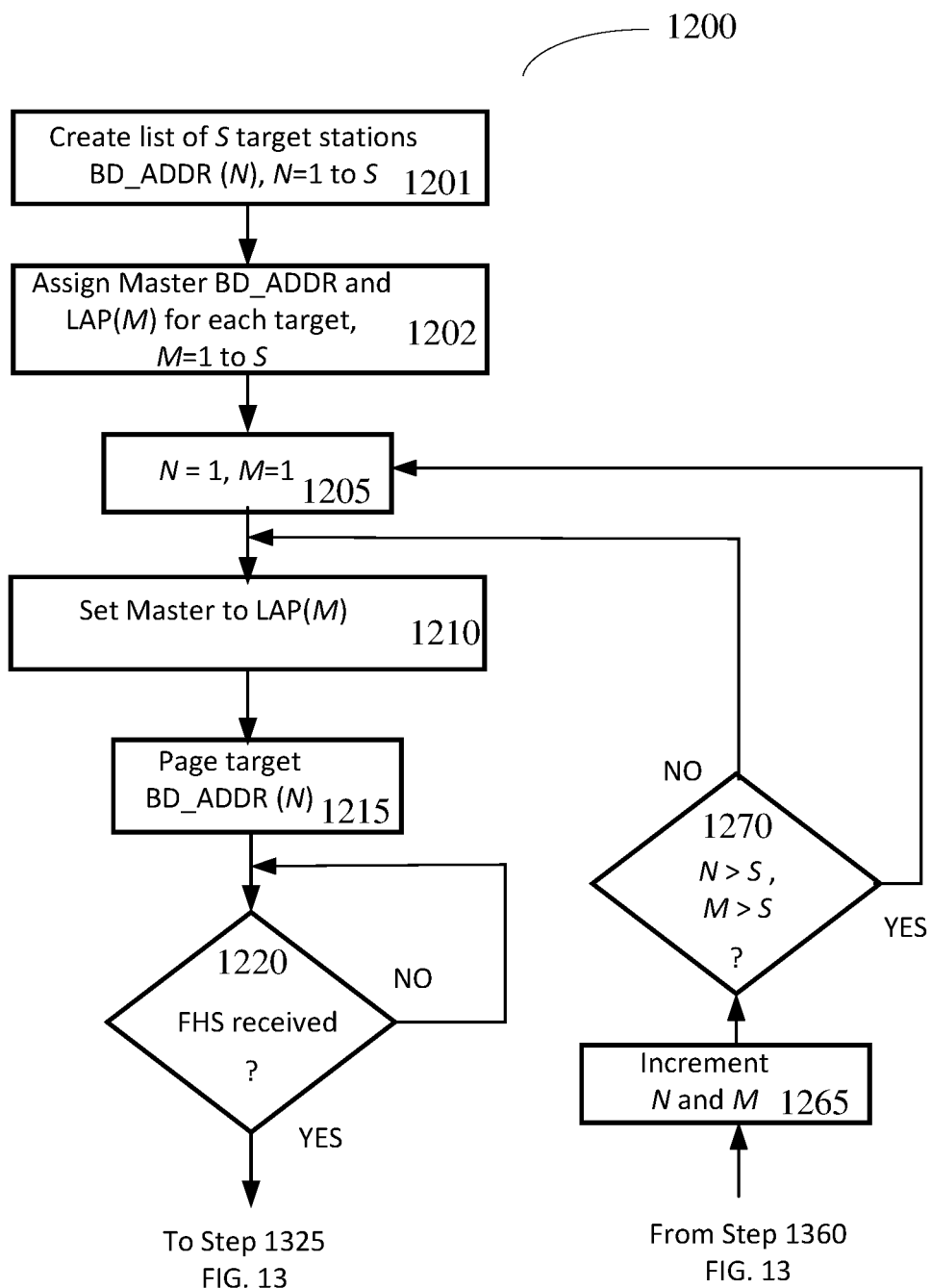
FIGS. 12 and 13 are flow diagrams of a process of one embodiment of the disclosure for determining the locations of a number of Bluetooth devices.
Figure 13:
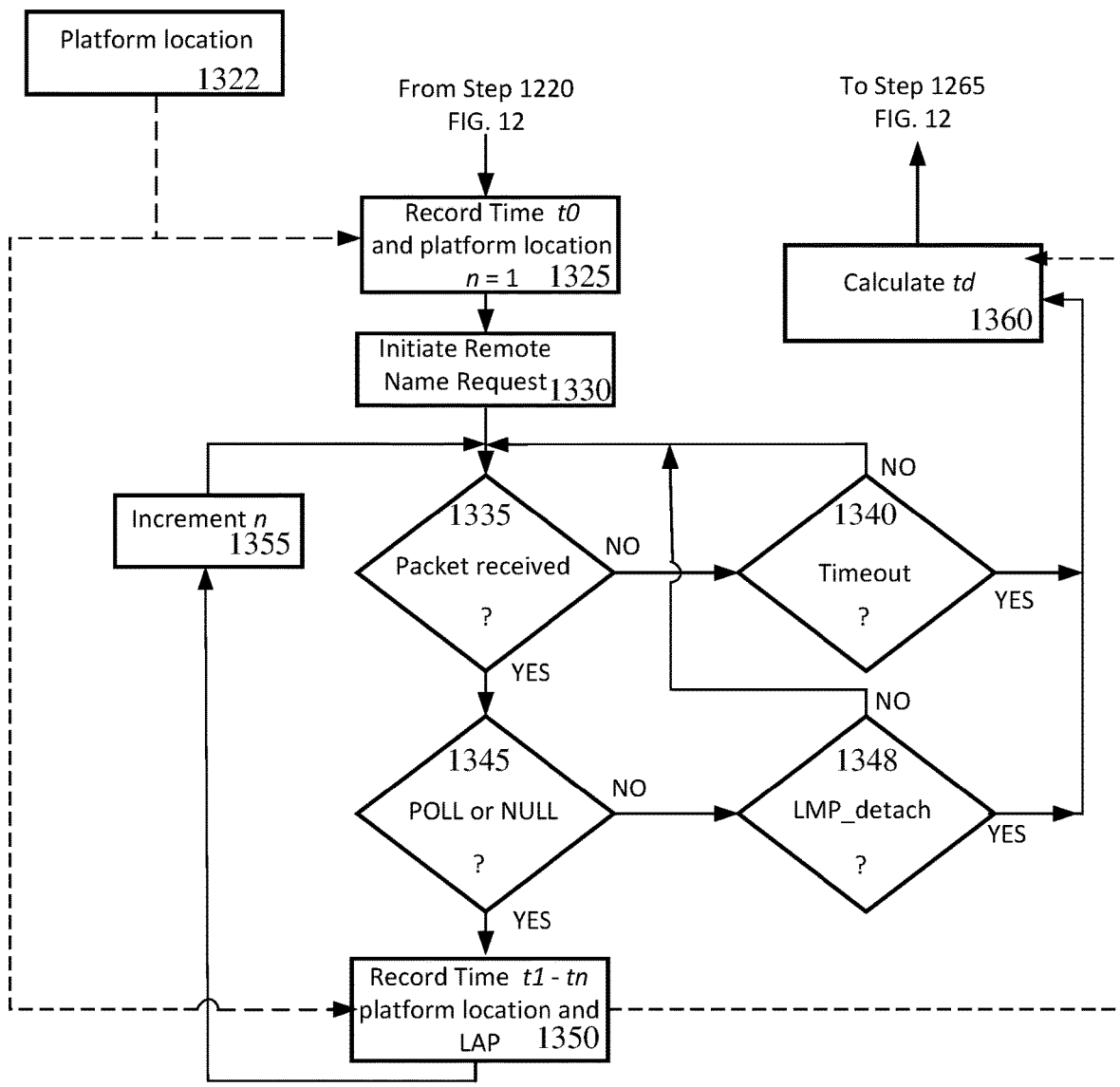

FIGS. 12 and 13 is a flow diagram of an example process 1200 of one embodiment of the disclosure for determining the locations of a number of Bluetooth devices. Process 1200 may start with step 1201 where a list of S target (Bluetooth) devices may be created. The target devices, i.e., Slaves 750, are identified by their respective BD_ADDR; hence the first target in the list is BD_ADDR (1), and the Nth target in the list is BD_ADDR (N). In step 1202 the BD_ADDR 300, and in particular the LAP 310 for the Master 710, is assigned for each of the S targets. The Master's LAP 310 is used in the Access Code 410 of all packets transmitted between the Master 710 and the Slave 750 on the piconet channel which is formed at step 5 605 in FIG. 6. For a Slave 750 with BD_ADDR(N), the Master 710 is assigned LAP(M), where M=N. At step 1210, N and M are initialized, i.e., N=1 and M=1. The list of S targets and their respective addresses, BD_ADDR(N), where N=1 to S, may be entered by an operator via the general purpose processor 1190 and stored in the processing circuitry 1130 and 1170. For the Master 710, the UAP 320 and NAP 330 values may be constant and then the Master LAP(M) addresses, may be set to correspond to each of the target BD_ADDRs. For example, if there are 5 target devices, S=5, with 5 different addresses, BD_ADDR(1) to BD_ADDR(5), then the LAP 310 of the Master 710 is set to LAP(1) to LAP(5) respectively. These LAP addresses may be set sequentially so as to identify the position of the target station in the list created in step 1201. For example, LAP(1) may be set to 00:00:01, LAP(2) to 00:00:02, LAP(3) to 00:00:03, LAP(3) to 00:00:04, and LAP(5) to 00:00:05. Hence, by noting the LAP associated with a packet (e.g., NULL) received by the wireless receiver 1150, that is used to calculate a td or RTT, a positive check may be made that that result is for that particular target device.

At step 1205 the values of N and M are initialized. With reference to the list created in step 1201, the Master 710 (acting as a wireless receiver/transmitter), via processing circuitry 1130 can select the BD_ADDR(1) for the first intended target device. In step 1210 the Master 710 (acting as a wireless receiver/transmitter), via processing circuitry 1130, can set the LAP(1) for transmissions from the Master 710 (acting as a wireless receiver/transmitter) via RF front end 1120. The values of BD_ADDR(1) and LAP(1) can be transferred to the processing circuitry 1170 in wireless receiver 1150, via the data bus 1185.

At step 1215, the Master 710 (acting as a wireless receiver/transmitter), may initiate the paging sequence, as discussed above with reference to FIG. 6, with the first target device, with BD_ADDR(1). Step 1215 may be followed by step 1220 where the wireless receiver 1150, performing the functions of a Bluetooth protocol analyzer, is waiting until the reception of the FHS packet, as discussed above with reference to FIG. 6 step 603. When the FHS packet is received, step 1220 may be followed by step 1325 in FIG. 13, where the reception time is recorded as time t0, together with the location of the wireless communication system 1100 which is provided by the platform location module 1192, step 1322. Also at step 1325 a variable n is initialized. Step 1325 may be followed by step 1330 where the Master 710, may initiate the sequence of packet exchanges for the remote name request with the target device, as discussed above with reference to FIG. 8 and FIG. 9. In step 1335 the wireless receiver 1150, performing the functions of a Bluetooth protocol analyzer, receives packets transmitted by the Master 710 and responding packets transmitted by the target device, as discussed above with reference to FIG. 9. If a packet is received, then step 1335 may be followed by step 1345 where a check is carried out to determine if the received packet is a Poll or a Null. If the received packet is a Poll or a Null, then the reception time, TOD or TOA respectively, is recorded as time tn, together with the LAP used in the Access Code of the received packet. Further, the location of the wireless communication system 1100, which is provided by the platform location module 1192, step 1322, is also recorded. Step 1345, which records the times of only Poll and Null packets, is an optional step. As discussed above with reference to FIGS. 8 and 9, all the packets exchanged during a remote name request sequence are single slot packets, with the Access Code based on the Master LAP. Hence, the reception times, tn, of all the received packets may be recorded. Polls and Nulls, however, are very common and a Null tends to always follow a Poll, and hence, the (relative) timing of the two packets is reliable. Step 1350 may be followed by step 1355 where the value of n is incremented and the process returns to step 1335. The sequence of steps 1335, 1345, 1350, and 1355 may result in a record of packet reception times, t1 to tn at step 1350 together with their corresponding LAP; the record continuing until the name request sequence, as discussed above with reference to FIG. 8, completes. The sequence may be terminated by the Master 710 (acting as a wireless receiver/transmitter) transmitting an LMP_detach packet 817. If the packet received at step 1335 is not a Poll or a Null, as determined at step 1345, then at step 1348 it may be determined if the packet is an LMP_detach packet. If step 1348 is true, then at step 1360 the time delays td, for that target station may be calculated based upon the recorded packet times, to to tn, from steps 1325 and 1350, as discussed above with reference to FIG. 7 and FIG. 10. When calculating the time delays tn, the LAP for each time, tn, may be checked to ensure that the times correspond to the same target station. The sequence of steps 1335, 1345, 1350, and 1355 together with step 1348 may be carried out by processing circuitry 1170 in wireless receiver 1150. The calculations as carried out in step 1360 may be performed by either in the processing circuitry 1170 in wireless receiver 1150 or by the general purpose processor 1190. In this latter case, the time and LAP data may be sent to the general purpose processor via data bus 1185.

A timeout value, Ttimeout, may be set and at step 1340, if a packet is not detected at step 1335 within a value of Ttimeout or greater, then it may be assumed that the remote name sequence has completed, and step 1340 may be followed by step 1360. In some embodiments, a data message from the processing circuitry 1130, indicating that the LMP_Detach packet has been transmitted, may be sent directly to the processing circuitry 1170 in the wireless receiver 1150, via data bus 1185 and used at step 1348.

The process may then return to step 1265, FIG. 12, where the values for N and M are incremented. A check may then be made at step 1270 if the new values for N and M are greater than S. If step 1270 is false, then the process returns to step 1210 where a new target device with address BD_ADDR(N) may be selected together with a new corresponding LAP(M) for the Master 710. If step 1270 is true, then the process returns to step 1205, where the values for N and M are reset to 1.

In order for the wireless receiver 1150 that is performing the functions of a protocol analyzer to follow the hopping sequence, the FHS packet at step 1220 needs to be detected. In the embodiment described above with reference to FIG. 13, at step 1325, the time of the detection of the FHS packet is recorded as the first packet time, t0. As discussed above with reference to FIG. 10 and equation (3), the first packet time, t0 may refer to a packet transmitted by the Master 710 (acting as a wireless receiver/transmitter). Poll packets are transmitted by the Master 710 and Null packets are transmitted by the target device and hence, the reception times of Polls and Nulls only, may be recorded, where the time of the detection of the first Poll packet of the sequence is recorded as the first packet time, t0.

As discussed above with reference to FIG. 8, the remote name request sequence ends with an LMP_detach packet 817. A series of several Polls and Nulls may continue before the connection is terminated as shown in FIG. 9. Step 1348 determines when the connection is terminated and if so determined, by returning the process to step 1210, a new Page and remote name request sequence is started for a new target device and a new corresponding LAP is selected for the Master 710, as discussed above with reference to step 1202. In each sequence, starting and returning to step 1210, the number of packets, mostly Polls and Nulls that are transmitted, may be in the order of 200. The corresponding times are recorded together with the LAP associated with each received Poll and Null at step 1350, and this list is used in step 1360 for the calculation of the time delays as discussed above with reference to FIG. 10.

The geo-location calculations may be performed by the general purpose processor 1190 and the transfer of the lists of times and LAPs between the processing circuitry 1170 and the general purpose processor 1190 may be subject to delays across the data bus 1185 as well as processing delays. If a constant BD_ADDR is used for the Master 710, then there is no distinction between the sets of time delays and, indeed, the hopping sequences. This may result in time delays being wrongly attributed to a target device, and errors in the geo-location may result. By selecting a unique LAP for the Master 710 to correspond to each target device, the time delays, together with the LAP form a unique dataset for each target device.

In another embodiment, as discussed above, a number of Masters 710 may be used such that more than one target device, slave 750, may be located simultaneously. With reference to process 1200, at step 1205, the values of N and M are initialized for each of the Masters 710. For example, if there are 3 Masters 710 present, and, for example, 6 target devices, i.e., N=M=6, then Master A may be used to locate target devices 1 and 2, Master B may be used to locate target devices 3 and 4, and Master C may be used to locate target devices 5 and 6. Hence, target devices 1, 3, and 4 may be simultaneously located, followed by target devices 2, 4, and 6 being simultaneously located as described above with reference to FIGS. 12 and 13, with the appropriate values of N, M and S being used for each Master 710.

Figure 14:
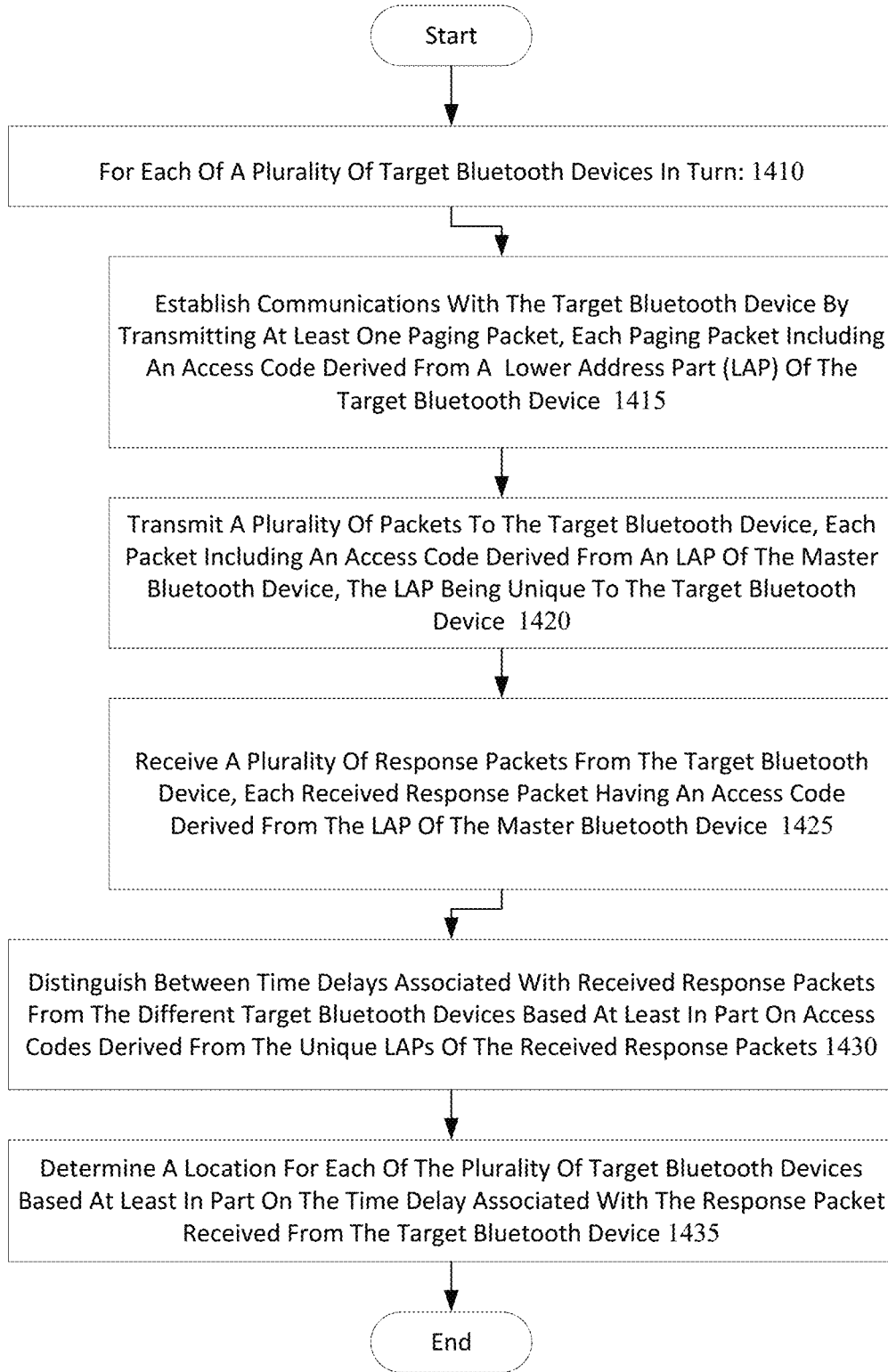
FIG. 14 is a flow diagram of a process in a master Bluetooth mobile device configured to communicate with a plurality of target Bluetooth devices.

FIG. 14 is a flow diagram of an example process in in a master Bluetooth mobile device configured to communicate with a plurality of target Bluetooth devices. The process may be performed by the processing circuitry 1130 and the RF front end 1120 and base band processor 1125, (referred to herein collectively as a radio interface) of a Bluetooth mobile device acting as a master Bluetooth mobile device 710. The process includes transmitting via the radio interface (RF front end 1120 and baseband processor 1125), for each of a plurality of target Bluetooth devices in turn step 1410: establishing communications with the target Bluetooth device by transmitting at least one paging packet, each paging packet including an Access Code derived from a lower address part (LAP) of the target Bluetooth device, at step 1415; transmitting a plurality of packets to the target Bluetooth device, each packet including an Access Code derived from an LAP of the master Bluetooth device, the LAP being unique to the target Bluetooth device, at step 1420; and receiving a plurality of response packets from the target Bluetooth device, each received response packet having an Access Code derived from the LAP of the master Bluetooth device, at step 1425. The process also includes distinguishing between time delays associated with received response packets from the different target Bluetooth devices based at least in part on Access Codes derived from the unique LAPs of the received response packets, at step 1430; and determining a location for each of the plurality of target Bluetooth devices based at least in part on the time delay associated with the response packet received from the target Bluetooth device, at step 1435.

In some embodiments, the lower address part of the plurality of paging packets are determined by a counter. In some embodiments, a time delay associated with a response packet received from a target Bluetooth device is determined based at least in part on a shift time, the shift time being a time of detection of the response packet relative to a time of detection of a first received response packet of the plurality of received response packets. In some embodiments, the time delay associated with the response packet received from the target Bluetooth device is determined according to: $t_d$=(shift time, MOD (2×slot time)−slot time)/2, wherein (shift time, MOD (2×slot time))>slot time, and slot time is a Bluetooth time division multiplex (TDM) slot duration. In some embodiments, a received response packet is a NULL packet. In some embodiments, determining a location for at least one of the plurality of target Bluetooth devices includes simultaneously determining locations of a plurality of target Bluetooth devices from which response packets are received. In some embodiments, only received response packets having an upper address part with an address of the master Bluetooth mobile device are included in distinguishing between time delays. In some embodiments, distinguishing between time delays includes sorting the time delays in order of time of detection. In some embodiments, only time delays associated with response packets received within a time window are sorted. In some embodiments, the method includes transmitting a data message to a target Bluetooth device indicating that a Link Management Protocol (LMP)_Detach packet has been transmitted.

Some embodiments may include one or more of the following:

Embodiment 1

A method for a wireless receiver, the wireless receiver being in communication with a first wireless transmitter/receiver and establishing a communication between the first wireless transmitter/receiver and each of a plurality of wireless transmitter/receiver targets, to identify the wireless transmitter/receiver target that transmits the packets, and the method comprising:

creating a set of unique addresses for the first wireless transmitter/receiver for communication with each of the wireless transmitter/receiver targets, such that transmissions to each wireless transmitter/receiver target are sent using a different corresponding unique address;

establishing communications, in turn, between the first wireless transmitter and each of a plurality of wireless transmitter/receiver targets using the corresponding unique address; inspecting the addresses in the received packets from the first wireless transmitter/receiver and the wireless transmitter/receiver targets; and matching the addresses in the received packets to the set of unique addresses to positively identify the transmitter of that packet.

Embodiment 1A.

A method for a wireless receiver for determining the geo-location of a plurality of wireless transmitter/receivers (wireless transmitter/receiver targets), the wireless receiver being in communication with a first wireless transmitter/receiver and establishing a communication between the first wireless transmitter/receiver and each of the wireless transmitter/receiver targets, the wireless receiver and the first wireless transmitter/receiver being movable to a plurality of different locations, the method comprising:

creating a set of unique addresses for the first wireless transmitter/receiver for communication with each of the wireless transmitter/receiver targets, such that transmissions to each wireless transmitter/receiver target are sent using a different unique address;

at each of the plurality of different locations of the wireless receiver, and for each establishment of a communication between the first wireless transmitter/receiver and a wireless transmitter/receiver target:

determining the location of the wireless receiver and the first wireless transmitter/receiver;

paging a wireless transmitter/receiver target to establish a communication;

for each establishment of a communication between the first wireless transmitter/receiver and a wireless transmitter/receiver target:

receiving a plurality of packets transmitted by the first wireless transmitter/receiver;

receiving a plurality of packets transmitted by the wireless transmitter/receiver target in response to the packets transmitted by the first wireless transmitter/receiver;

determining a reception time of each of the plurality of packets transmitted by the first wireless transmitter/receiver and the wireless transmitter/receiver target, the reception time of each of the plurality of packets having a corresponding time delay, td; and evaluating the address in each of the plurality of received packets and sorting the reception times of each of the plurality of received packets to correspond to a one of the wireless transmitter/receiver targets; and determining a location of each wireless transmitter/receiver target identified by the corresponding unique packet address and corresponding calculated time delay delays.

Embodiment 2.

The method of any one of Embodiments 1 and 1A, wherein the wireless receiver, the first wireless transmitter/receiver and the wireless transmitter/receiver targets are Classic Bluetooth Basic Rate devices.

Embodiment 3.

The method of any one of Embodiments 1 and 1A, wherein the set of unique addresses, BD_ADDR for the first wireless transmitter/receiver for communication with each of the wireless transmitter/receiver targets, is such that the upper address part (UAP) and non-significant address part (NAP), are kept constant and only the lower address part (LAP) is unique.

Embodiment 4.

The method of Embodiment 3, wherein the values of the LAP are incremented to correspond with each of the wireless transmitter/receiver targets.

Embodiment 5.

The method of any one of Embodiments 1 and 1A, wherein the establishment of a communication between the first wireless transmitter/receiver and the second wireless transmitter/receiver is initiated by the sending of a Page message from the first wireless transmitter/receiver to the second wireless transmitter/receiver, and wherein the plurality of packets transmitted by the first wireless transmitter/receiver and transmitted by the second wireless transmitter/receiver is increased by the transmission of a Link Management Protocol (LMP) name request from the first wireless transmitter/receiver to the second wireless transmitter/receiver.

Embodiment 6.

The method of Embodiment 1A, wherein the time delay, td, is determined as:

$$td=(\text{Shift Time, MOD } (2\times\text{slot time})-\text{slot time})/2,$$

wherein Shift Time, MOD $(2\times\text{slot time})>\text{slot time}$; and where "Shift Time" is a recorded reception time of a packet referenced to the recorded reception time of a first received packet by the wireless receiver, and "slot time" is a time division multiplex (TDM) slot duration of a wireless system comprising the wireless receiver, the first wireless transmitter/receiver and the second wireless transmitter/receiver.

Embodiment 7.

The method of any one of Embodiments 1 and 1A, wherein the method further comprises, for each of the received plurality of packets:

identifying a packet type; and if the identified packet type is one of a first packet type and a second packet type, recording the reception time of the identified packet.

Embodiment 8.

The method of Embodiment 7, wherein the first packet type is a POLL and the second packet type is a NULL.

Embodiment 9.

The method of any one of Embodiments 1 and 1A, wherein the method further comprises the simultaneous location of a plurality of target devices, the method comprising:

deploying a plurality of Master transmitter receivers;

deploying a Bluetooth protocol receiver that monitors all channels;

evaluating the address in each of the plurality of received packets and sorting the reception times of each of the plurality of received packets to correspond to each one of the wireless transmitter/receiver targets; and determining a location of each wireless transmitter/receiver target identified by the corresponding unique packet address and corresponding calculated time delay delays.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the method used to allocate the BD_ADDR and/or the LAP, the details of the Bluetooth protocol analyzer, the time recording of different packet types, the value of Ttimeout, variations in the details of the wireless communications system. Accordingly, the scope should be determined not by the embodiments illustrated, but by the below-listed claims and their equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A master Bluetooth mobile device configured to communicate with a plurality of target Bluetooth devices, the master Bluetooth mobile device comprising:
a radio interface configured, for each of the plurality of the target Bluetooth devices, in turn to:
establish communications with the target Bluetooth device by transmitting at least one paging packet, each paging packet of the at least one paging packet including an Access Code derived from a lower address part (LAP) of the target Bluetooth device, wherein the LAP of the target Bluetooth device is determined by a counter;
transmit a plurality of packets to the target Bluetooth device, each packet of the plurality packets including an Access Code derived from an LAP of the master Bluetooth device, the LAP of the master Bluetooth device being unique to the target Bluetooth device; and
receive a plurality of response packets from the target Bluetooth device, each received response packet from the plurality of the response packets having an Access Code derived from the LAP of the master Bluetooth device; and
processing circuitry in communication with the radio interface, the processing circuitry configured to:
distinguish between time delays associated with received response packets from the different target Bluetooth devices based at least in part on Access Codes derived from the LAPs of the received response packets; and
determine a location for each of the plurality of target Bluetooth devices based at least in part on a time delay associated with the response packet received from the target Bluetooth device.

2. The master Bluetooth mobile device of claim 1, wherein the time delay associated with the response packet received from the target Bluetooth device is determined based at least in part on a shift time, the shift time being a time of detection of the response packet relative to a time of detection of a first received response packet of the plurality of received response packets.

3. The master Bluetooth mobile device of claim 2, wherein the time delay associated with the response packet received from the target Bluetooth device is determined according to:

$$t_d = (\text{shift time, MOD}(2 \times \text{slot time}) - \text{slot time})/2,$$

wherein (shift time, MOD(2×slot time))>slot time, and slot time is a Bluetooth time division multiplex (TDM) slot duration.

4. The master Bluetooth mobile device of claim 1, wherein the time delay associated with the response packet received from the target Bluetooth device is measured when the received response packet is a NULL packet.

5. The master Bluetooth mobile device of claim 1, wherein determining the location for at least one of the plurality of target Bluetooth devices includes simultaneously determining locations of the plurality of target Bluetooth devices from which the response packets are received.

6. The master Bluetooth mobile device of claim 1, wherein only the received response packets from the different target Bluetooth devices having an upper address part with an address of the master Bluetooth mobile device are included in distinguishing between the time delays.

7. The master Bluetooth mobile device of claim 1, wherein distinguishing between the time delays includes sorting the time delays in order of time of detection.

8. The master Bluetooth mobile device of claim 7, wherein only time delays associated with response packets received within a time window are sorted.

9. The master Bluetooth mobile device of claim 8, wherein the radio interface is further configured to transmit a data message to the target Bluetooth device indicating that a Link Management Protocol (LMP) Detach packet has been transmitted.

10. A method for operating a master Bluetooth mobile device configured to communicate with a plurality of target Bluetooth devices, the method comprising:

for each of the plurality of the target Bluetooth devices, in turn:
establishing communications with the target Bluetooth device by transmitting at least one paging packet, each paging packet of the at least one paging packet including an Access Code derived from a lower address part (LAP) of the target Bluetooth device, wherein the LAP of the target Bluetooth device is determined by a counter;
transmitting a plurality of packets to the target Bluetooth device, each packet of the plurality of packets including an Access Code derived from an LAP of the master Bluetooth device, the LAP of the master Bluetooth device being unique to the target Bluetooth device; and
receiving a plurality of response packets from the target Bluetooth device, each received response packet from the plurality of the response packets having an Access Code derived from the LAP of the master Bluetooth device; and
distinguishing between time delays associated with received response packets from the different target Bluetooth devices based at least in part on Access Codes derived from the LAPs of the received response packets; and
determining a location for each of the plurality of target Bluetooth devices based at least in part on a time delay associated with the response packet received from the target Bluetooth device.

11. The method of claim 10, wherein the time delay associated with the response packet received from the target Bluetooth device is determined based at least in part on a shift time, the shift time being a time of detection of the response packet relative to a time of detection of a first received response packet of the plurality of received response packets.

12. The method of claim 11, wherein the time delay associated with the response packet received from the target Bluetooth device is determined according to:

$$t_d = (\text{shift time, MOD}(2\times\text{slot time}) - \text{slot time})/2,$$

wherein (shift time, MOD(2×slot time)) >slot time, and slot time is a Bluetooth time division multiplex (TDM) slot duration.

13. The method of claim 10, wherein the time delay associated with the response packet received from the target Bluetooth device is measured when the received response packet is a NULL packet.

14. The method of claim 10, wherein determining the location for at least one of the plurality of the target Bluetooth devices includes simultaneously determining locations of the plurality of target Bluetooth devices from which the response packets are received.

15. The method of claim 10, wherein only the received response packets from the different target Bluetooth devices having an upper address part with an address of the master Bluetooth mobile device are included in distinguishing between the time delays.

16. The method of claim 10, wherein distinguishing between the time delays includes sorting the time delays in order of time of detection.

17. The method of claim 16, wherein only time delays associated with response packets received within a time window are sorted.

18. The method of claim 17, further comprising transmitting a data message to the target Bluetooth device indicating that a Link Management Protocol (LMP) Detach packet has been transmitted.

* * * * *